United States Patent [19]

Mannen

[11] Patent Number: 4,865,104
[45] Date of Patent: * Sep. 12, 1989

[54] TIRE CHANGER SAFETY APPARATUS AND METHOD

[75] Inventor: Bryce L. Mannen, Conway, Ark.

[73] Assignee: FMC Corporation, Chicago, Ill.

[*] Notice: The portion of the term of this patent subsequent to May 10, 2005 has been disclaimed.

[21] Appl. No.: 146,064

[22] Filed: Jan. 20, 1988

Related U.S. Application Data

[63] Continuation of Ser. No. 938,215, Dec. 5, 1986, Pat. No. 4,742,859.

[51] Int. Cl.$^4$ .............................................. B60C 25/00
[52] U.S. Cl. ........................................ 157/1; 157/14; 157/19; 157/21
[58] Field of Search .................... 157/1, 1.1, 14, 19, 157/21; 269/130, 131, 132, 239; 224/42.10, 42.26, 42.27, 42.28

[56] References Cited

U.S. PATENT DOCUMENTS

| | | | |
|---|---|---|---|
| 1,256,493 | 2/1918 | West | 224/42.26 |
| 2,661,131 | 12/1953 | Roy | 224/42.26 |
| 3,552,469 | 1/1971 | Corless | 157/1.1 |
| 3,675,705 | 7/1972 | Corless | 157/1.1 |
| 3,677,320 | 7/1972 | Corless | 157/1.1 |
| 3,785,424 | 1/1974 | Rishovd | 157/1.1 |
| 3,805,871 | 4/1974 | Corless | 157/1.1 |
| 4,057,093 | 11/1977 | Joines | 157/1 |
| 4,263,958 | 4/1981 | Corless | 157/1.1 |
| 4,335,772 | 6/1982 | Bubick et al. | 157/1.28 |
| 4,381,027 | 4/1983 | Molen et al. | |
| 4,545,573 | 10/1985 | Murphy | 269/131 |
| 4,742,859 | 5/1988 | Mannen | 157/1 |

FOREIGN PATENT DOCUMENTS

| | | | |
|---|---|---|---|
| 82/04024 | 11/1982 | European Pat. Off. | |
| 1524514 | 9/1978 | United Kingdom | 157/1 |

OTHER PUBLICATIONS

Two-page brochure entitled "CP/Coats Air-Flate Rim Clamp Tire Changer", -RC-10A, date unknown.

*Primary Examiner*—Frederick R. Schmidt
*Assistant Examiner*—Robert Showalter
*Attorney, Agent, or Firm*—H. M. Stanley; R. C. Kamp; R. B. Megley

[57] ABSTRACT

A tire changer has the feature of therefor restraining vehicle tire/rim assemblies which are caused to explode due to tire overinflation or tire bead failure for any reason. A tire and rim assembly hold down bar is pivotally attached to one side of the body of the tire changer and is secured in position immediately overlying the tire/rim assembly on the tire changer by engaging a tongue in a buckle assembly mounted on the bar. The tongue is attached to the end of a web belt which is secured to the other side of the body of the tire changer. Engagement of the tongue in the buckle also actuates an enabling valve in a conduit for transmitting tire inflation air from a pressure source to the tire. Inflation air may then be provided at will to the tire by actuation of an inflation valve located in the air conduit between the pressure source and the tire.

5 Claims, 7 Drawing Sheets

FIG-2

FIG_3A

FIG_3B

FIG_3C

FIG_4

FIG_7

FIG_8

TIRE CHANGER SAFETY APPARATUS AND METHOD

This is a continuation of application Ser. No. 938,215, filed 12/5/86, now U.S. Pat. No. 4,742,859.

SUMMARY OF THE INVENTION

A safety apparatus on a tire changer has a table for receiving a tire and rim assembly, which includes tire and rim retention means attached to one side of the tire changer disposable adjacent one side of the table and movable between a position retaining a tire and rim on the table and a position remote therefrom. The retention means has a free end. Releasable locking means is fixed to the other side of the tire changer adjacent the other side of the table and is adapted to couple with the retention means free end. In this fashion when the retention means is coupled with the locking means, a tire and rim assembly will be retained on the table if it is overinflated to the point of explosion.

In another aspect of the invention there is disclosed an improvement in a tire changer having a support table for receiving a tire and rim assembly for performance of operations on the tire and rim while on the support table. The performed operations include tire installation on and removal from the rim. Further, the tire is inflated by an inflation system while supported on the table following tire installation. The improvement includes a safety device including belt means attached to the tire changer adjacent to one side of the support table, wherein the belt means has a free end. Engaging means is provided for coupling with the belt free end, wherein the engaging means is attached to the tire changer adjacent the other side of the support table.

DESCRIPTION OF THE PREFERRED EMBODIMENTS

Figure 1:
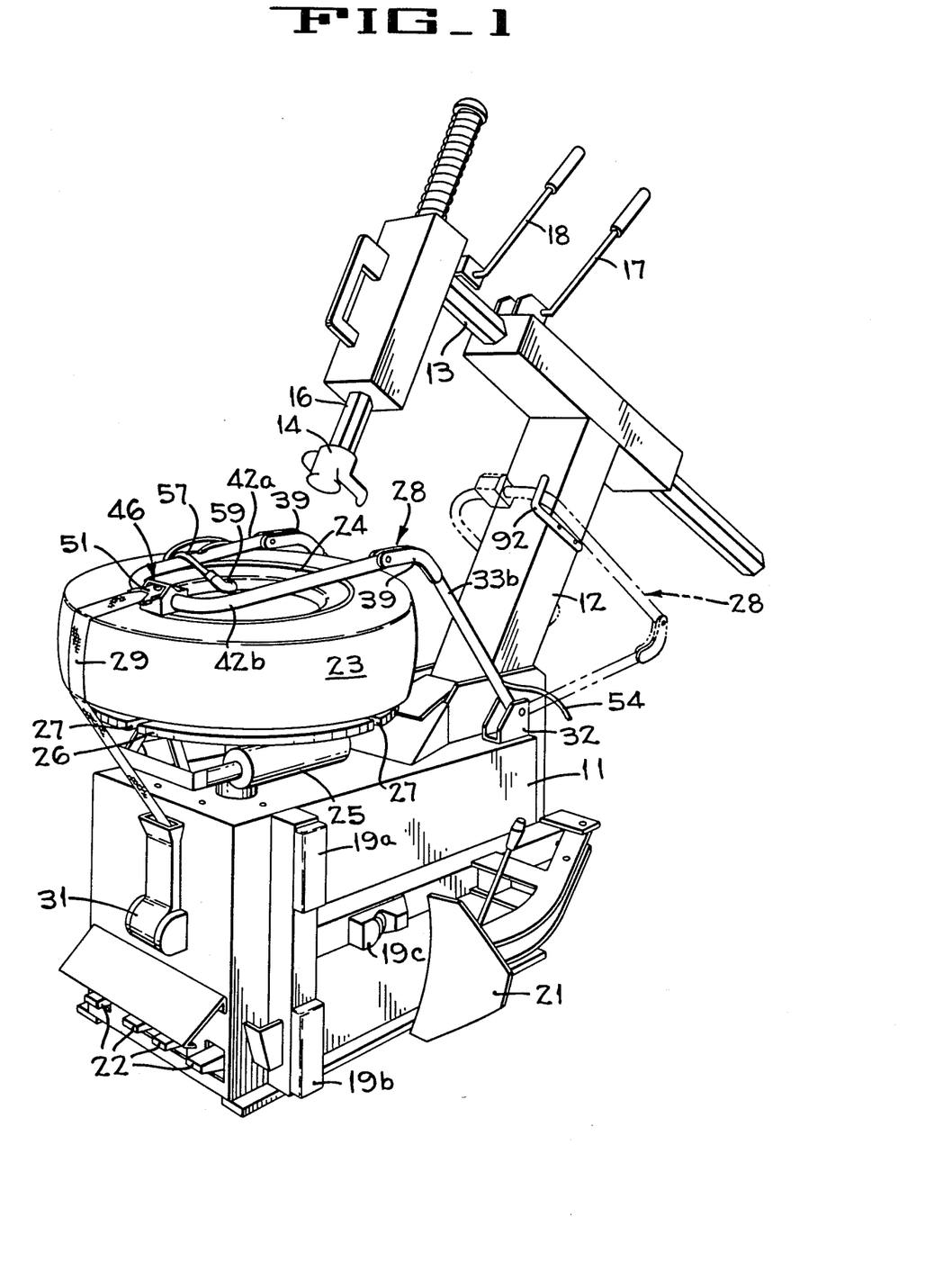
FIG. 1 is a perspective view of a tire changer utilizing the present invention.

The invention disclosed herein will be described primarily in conjunction with a rotating table type tire changer for mounting and demounting tires onto and from vehicle wheel rims. The apparatus and method described herein is also useful on a tire changer having a stationary table for receiving the rim of a vehicle wheel. A tire changer of the first mentioned type is shown in FIG. 1 having a base shown generally at 11 with a tower 12 mounted at one end of the base. The tower is disposed to rock into the position shown in FIG. 1 as well as into a position where the tower is in a substantially vertical position. An arm 13 is disposed to slide through an upper portion of the tower 12 to dispose a tire mount-demount head 14 in a position overlying the junction of a vehicle wheel rim and a tire bead when the tower 12 is in the substantially vertical position. A vertical adjust arm 16 is adjustable to place the mount-demount head in proper position relative to the tire bead and the wheel rim to mount or demount the tire therefrom as desired. The horizontal and vertical adjust arms 13 and 16 are capable of being locked in position by means of locking mechanisms actuated by locking handles 17 and 18. Actuation of the locking handles spaces the mount-demount head 14 appropriately from the vehicle rim to avoid damage to the rim as is well known in the art.

The base 11 has appropriate support blocks 19a, 19b and 19c against which a wheel rim and tire assembly may be placed for support while a tire bead is broken away from the wheel rim by a bead breaker shoe 21. The bead breaker is actuated pneumatically in a manner well known in this art to move away and toward the base 11, thereby being useful in separating the bead of a tire from the rim of a wheel supported against the blocks 19a, b and c. A group of foot pedals shown generally at 22 are disposed at the lower end of the base 11 opposite from the side of the base supporting the tower 12 for actuation by an operator to perform the functions carried out by the tire changer.

A tire 23 is shown disposed on a rim 24 lying on top of a rotating table 26 in the tire changer of FIG. 1. The table is rotated by means of an electrical motor and interconnecting gearing (not shown) which is known in this art and is supported within the base 11. The table in this type of tire changer has a number (in most cases 4) of radially moving jaws which are disposed to move in grooves 27 shown intercepting the edge of the table 26 to clamp either the inside or the outside of the rim 24. The jaws on the tire changer of FIG. 1 are caused to move radially by actuation of two pneumatic cylinders 25 positioned beneath the table 26 and above the base 11 which, through a system of simple levers, cause the jaws to undergo their aforedescribed radial movement. In this known manner the tire 23 and rim 24 assembly is firmly positioned on top of the table 26. However, in a tire changer where the wheel and rim assembly is captured to prevent radial motion on a tire changer table, motion of the tire and wheel assembly, or parts thereof, axially away from the table is not restrained to any appreciable degree. Therefore, if a tire mounted on the table is overinflated to the point of explosion, the tire rim assembly will move violently upward off of the table 26 endangering any persons situated in the near vicinity.

The manner in which the violent movement of an exploding tire and rim assembly may be arrested involves placing a member such as a hold-down or pivoted tube assembly shown generally at 28 in FIG. 1 in a position overlying the tire and rim assembly on the table. Some means such as a webbed belt 29 extending from an inertia reel 31 attached to the base 11 shown in FIG. 1 must be provided for holding the assembly 28 in a position overlying the wheel and tire assembly. The webbed belt 29 and the hold-down assembly 28 are securely joined in a manner to be hereinafter described.

Figure 2:
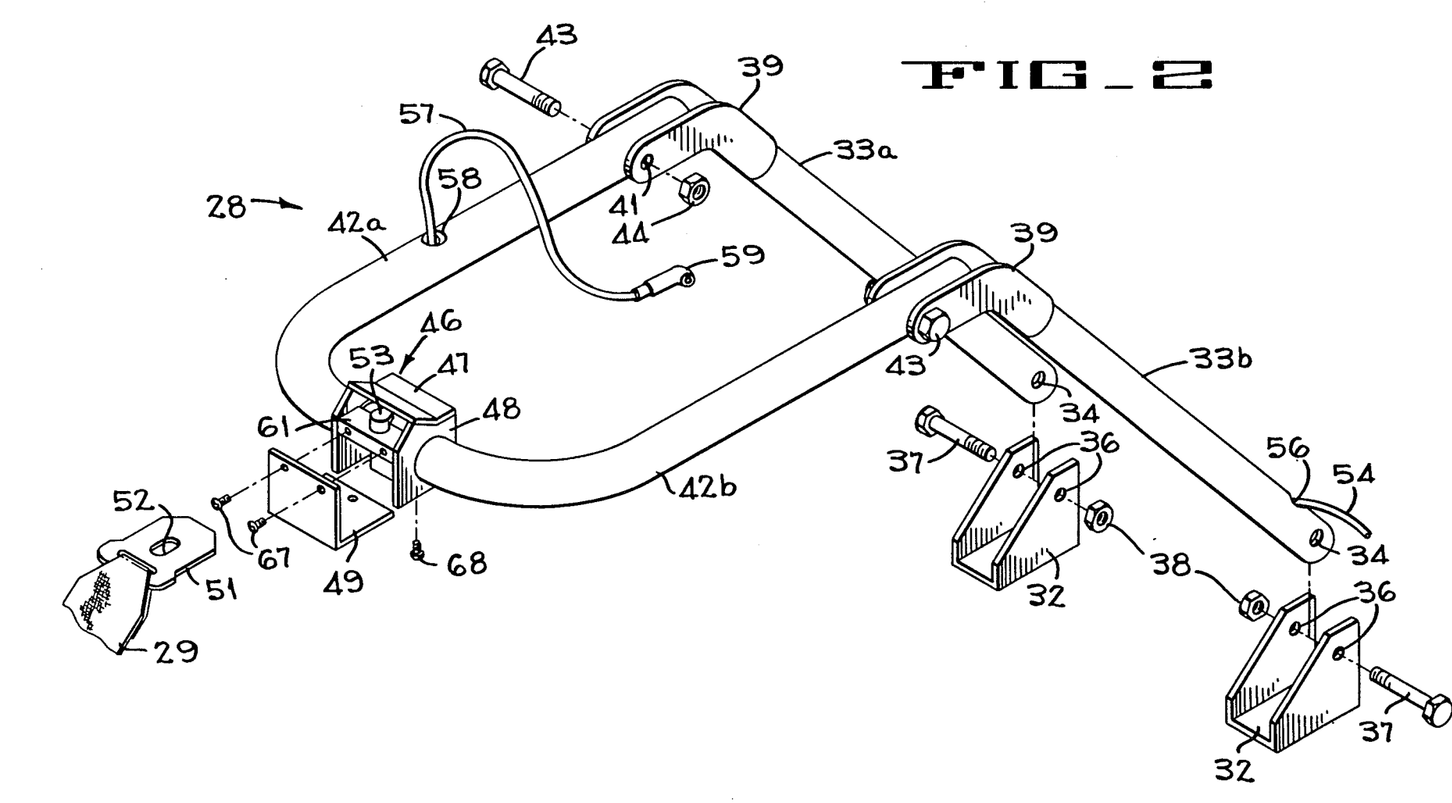
FIG. 2 is a perspective view of the hold down bar of the present invention.

With reference now to FIG. 2 of the drawings the hold-down or pivoted tube assembly 28 is shown with details regarding its attachment to the base 11 of the tire changer as well as other details of construction of one suitable type of hold-down or restraining apparatus. Two strong steel brackets 32 are fixed to the upper reaches of the base 11. A pair of strong straight metal tubes 33a and 33b are fashioned with a hole 34 in one end. Holes 36 are fashioned in the upwardly extending flanges of the brackets 32. When the holes 34 are aligned with the holes 36 in the brackets 32 and a bolt 37 is passed therethrough, a pivot is formed between the brackets and the straight tube sections. The bolts 37 are held in place by nuts 38.

A pair of angled arms 39 are securely fixed to the ends of the straight tubes 33 opposite the end through which the holes 34 are formed. The other end of the arms 39 have aligned holes 41 formed therethrough. A pair of "J" shaped tube sections 42a and 42b have holes formed therethrough which, when aligned with the holes 41 in the arms 39, will receive a pivot bolt 43 secured in place by a nut 44 so that the "J" shaped tube sections may pivot relative to the arms 39 and therefore relative to the straight tube sections 33a and 33b. The "J" shaped tube sections are positioned so that their curved ends approach one another and are both engaged in opposite sides of a buckle assembly 46. The buckle assembly has a top cover 47, a housing 48 and a bottom cover 49. The webbed belt 29 has a tongue 51 securely fixed to the end thereof which is shaped to enter the buckle assembly 46 in a manner to be hereinafter described. The tongue 51 has an elongate hole 52 which is disposed to receive a stud 53 in the buckle assembly 46 when the tongue is in locked engagement with the buckle assembly.

FIG. 2 also shows a pressure portion of pneumatic hose 54 entering the straight tube portion 33b through a hole 56 near the pivoted end thereof. The pressure hose portion extends through the straight tube section 33b and through the "J" shaped tube section 42b into the buckle assembly 46. An additional portion 57 of pneumatic hose extends from the other side of the buckle assembly 46 through the interior of the opposite "J" shaped tube 42a, exiting therefrom through a hole 58 as shown in FIG. 2. The additional hose portion 57 has attached at the free end thereof an air chuck 59 which is adapted to mate with the inflation valves on tire-rim assemblies 23-24.

Figure 3A:
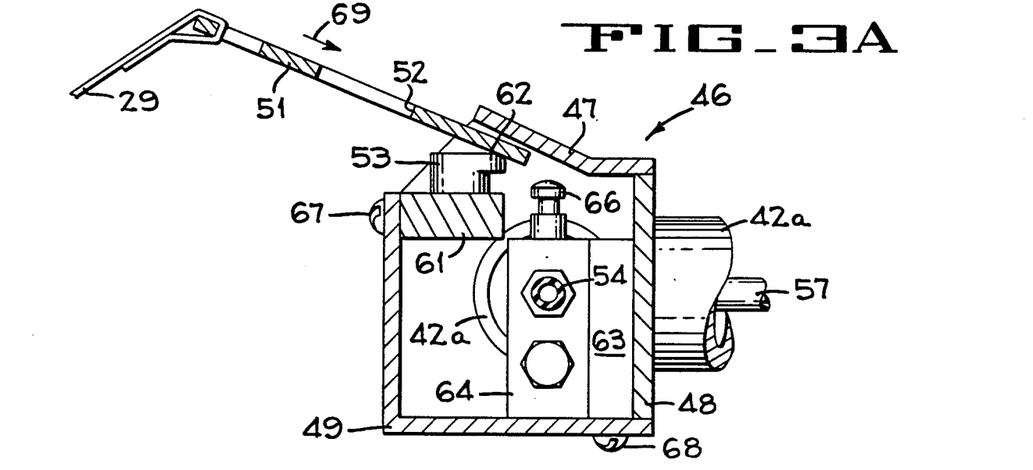
FIGS. 3A–3C depict the engagement of the tongue and buckle and the actuation of the enabling valve of the present invention.
Figure 3B:
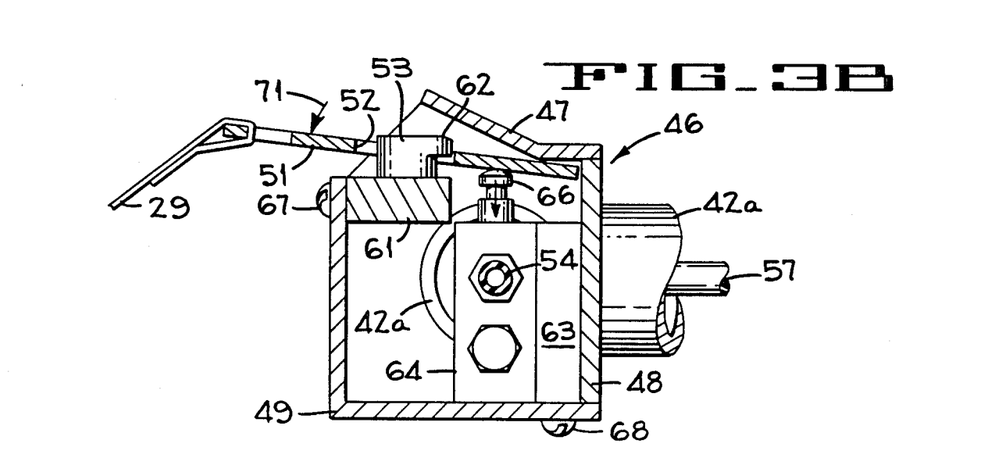
Figure 3C:
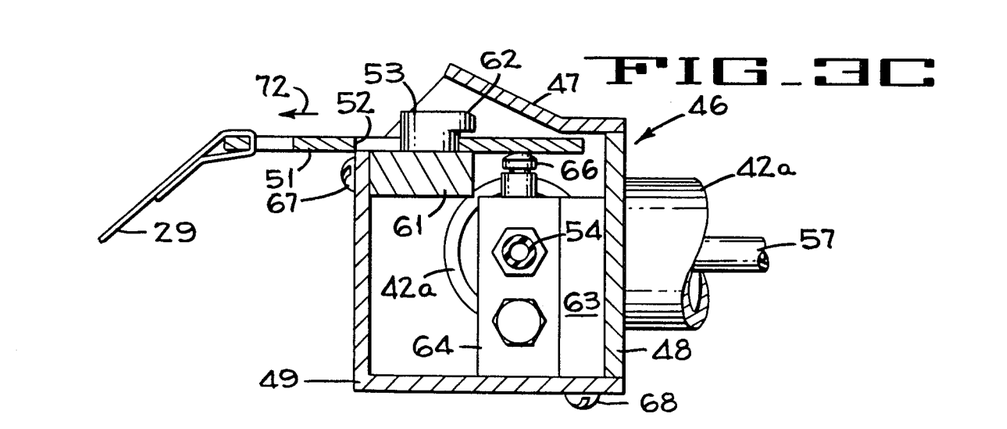

FIGS. 3A through 3C show the internal construction of the buckle assembly 46 and the manner in which the pneumatic tubes 54 and 57 enter and exit therefrom respectively. A safety stud mounting plate 61 is fixed between the opposing walls of the housing 48 by means of welding for example. The safety stud 53 is mounted centrally on the plate 61 also by some means such as welding. The safety stud has an overhanging lip 62 extending toward the interior of the buckle assembly 46. The top of the safety stud and the overhanging lip are of such a size in the direction of the extended lip to pass through the long dimension of the elongate hole 52 in the tongue 51. The stud in its width dimension is of a size such as to pass through the width of the elongate hole 52, but with less clearance.

A valve mount plate 63 is fixed, as by welding, to the rear surface of the buckle housing 48. A pneumatic valve 64 is mounted to the plate by any convenient means such as screws, so that the pressure section 54 of pneumatic hose enters the valve from the "J" shaped tube section 42b (FIG. 2). The additional section 57 of pneumatic hose exits the opposite side of the pneumatic valve 64 extending into the "J" shaped tube section 42a. The pneumatic valve is actuated by a button 66 extending from the top thereof. The button 66 is spring loaded to a position blocking flow of air through the valve. It may be seen in FIGS. 3A-3C that the "L" shaped bottom cover 49 is secured to the buckle assembly 46 by means of screws 67 engaging holes threaded in the safety stud mounting plate and a screw 68 engaging a threaded hole formed in the bottom of the valve mounting plate 63.

It may also be seen by reference to the FIGS. 3A-3C that positioning the tongue 51 into the buckling assembly 46 in accordance with the direction of the arrow 69 as shown in FIG. 3A, that the tongue passes over the top of safety stud 53 and underneath the angled top cover 47 on the buckle assembly. When the tongue 51 is inserted the full distance into the buckle assembly, the tongue is depressed as shown by the arrow 71 in FIG. 3B so that it falls below the lip 62 on the safety stud. Subsequently the tongue 51 is moved in the direction of the arrow 72 seen in FIG. 3C to place the edge of the hole 52 in a position underlying the lip 62 on the safety stud. Consequently, the tongue is inserted (arrow 69), engaged (arrow 71), and locked (arrow 72) by the serial steps depicted in FIGS. 3A, 3B and 3C.

It should be noted that the inertia reel 31 and belt assembly 29 may be obtained from the Beams Manufacturing Division, 2600 West Main, Oklahoma City, Okla., in accordance with that vendor's Part Number FW-01. The webbed belt 29 length as used is appropriately five feet and the belt tensile strength is in excess of 2500 pounds. The emergency locking retractor is an inertia reel type device and the aforementioned vendor part number includes both the reel and the length of webbed belt.

Figure 4:
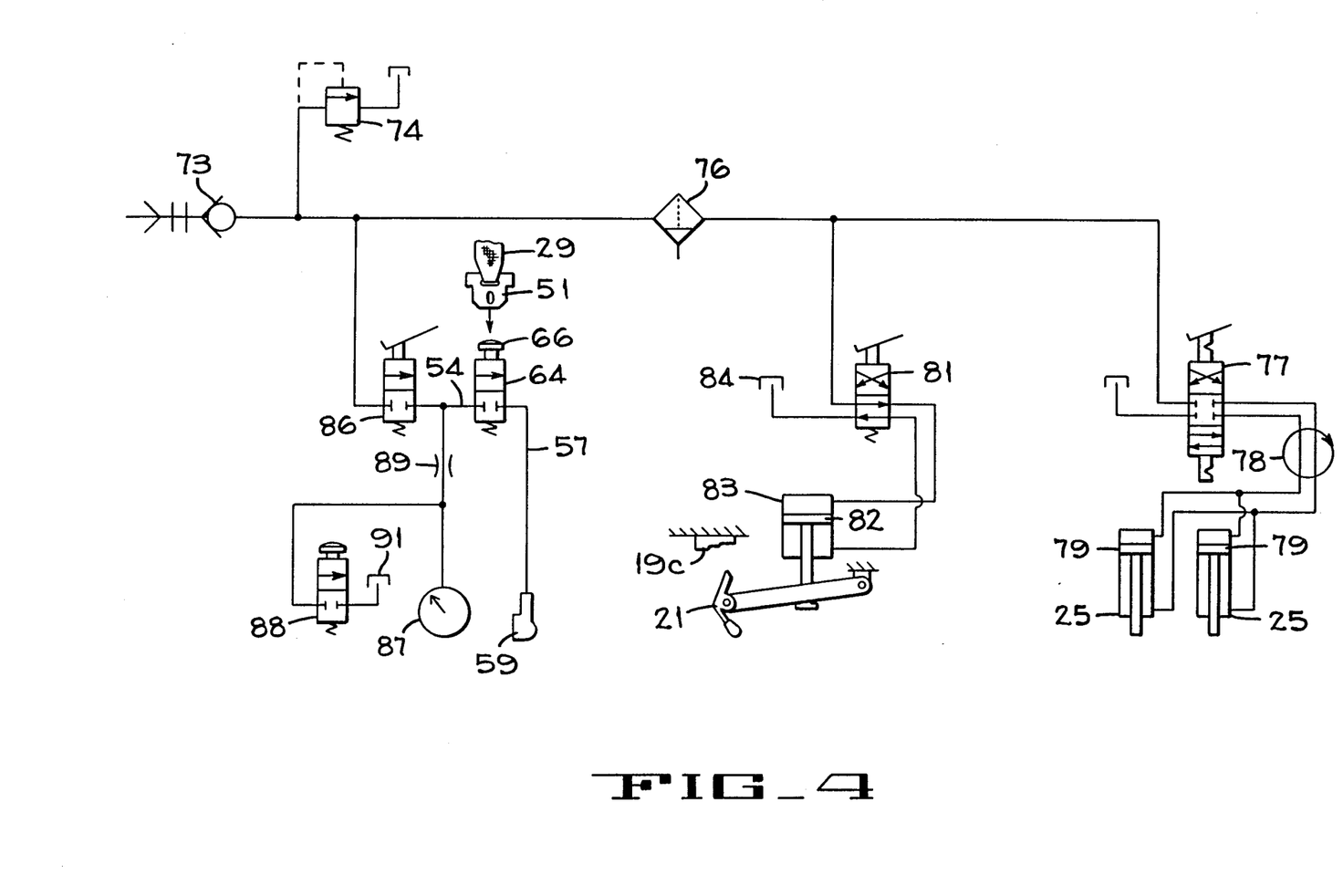
FIG. 4 is a pneumatic schematic of the tire changer of FIG. 1.

By way of clarifying the operation of the tire changer of FIG. 1, refrerence is made to the pneumatic schematic of FIG. 4. Pressure air is introduced into the pneumatic system contained within and around the base 11 through a quick-connect coupler 73. A relief valve 74 is depicted near the pneumatic system inlet and is set to relieve the system at 200 psi for this particular application. The pneumatic line extends through a water separator and filter 76 and is connected to a rim clamp jaw actuator valve 77 which is actuated by one of the foot pedals in the array 22 shown in FIG. 1. Valve 77 is a two way valve which, when actuated in one direction or the other, passes pressure air through a rotary air coupler 78 to one side or the other of a pair of pistons 79 in the jaw actuator cylinders 25. As mentioned before, travel of the piston 79 in one direction within the cylinders 25 cause the wheel rim clamps to travel in one radial direction in the grooves 27 on the table 26 and movement of the pistons 79 in the opposite direction causes the wheel rim clamp members to move in the opposite radial direction on the table 26. The bidirectional valve 77 is therefore utilized to cause the wheel rim gripping jaws to extend radially outward in one direction of actuation and radially inward in the other direction.

Also depicted in the pneumatic schematic of FIG. 4 is the path of pressurized air through a valve 81, actuated also by a foot pedal in the array 22 of FIG. 1. This valve directs air toward one side or the other of a piston 82 in a cylinder 83 enclosed within the base 11 of the tire changer. The position of the valve 81 as shown in FIG.

4 may be seen to drive the piston 82 outwardly away from the base 11 and therefore to carry the bead breaker shoe 21 away also. Actuation of the foot pedal placing valve 81 in the alternate position will drive the piston 82 upwardly in cylinder 83 as seen in FIG. 4, thereby causing the bead breaker shoe 21 to approach the block 19c to thereby bear against and break a bead from a vehicle rim. Pressure is exhausted from the nonpressurized side of the piston 82 through a vent 84.

Also with reference to FIG. 4, the tongue 51 secured to the end of the webbed belt 29 is used to actuate the valve 64 from a closed position to an open position by depressing the button 66 on the valve as shown in FIGS. 3A–3C. Valve 64 when opened may be seen to enable the air path from the pressure source to the air chuck 59. With the air conduit to the air chuck 59 enabled, actuation of the appropriate foot pedal in the array 22 (FIG. 1) will actuate an inflater valve 86 causing pressurized air to flow from the air pressure source through valves 86 and 64 up to the air chuck 59, which allows pressure air to enter the tire being inflated on the table 26 of the tire changer. An air pressure gauge 87 is provided to monitor the air pressure at the air chuck 59, and therefore within the tire being inflated. A pressure air bleeder valve 88 is provided in the system, wherein both the bleeder valve and the pressure gauge are supplied through a restricted passage 89 for pneumatic purposes. The bleeder valve exhausts air pressure to a vent 91. The pressure gauge has been found to be satisfactory for this application if it has a 0 to 60 pounds per square inch scale.

It should be apparent from the foregoing that the apparatus described is appropriate for practicing the process of safety inflating a vehicle tire on a vehicle rim while the tire and rim are mounted on a table on a tire changing machine. The machine has a conduit for delivering inflation air from a pressure source to the vehicle tire as set forth in the description of FIG. 4 herein. The process involves placing a rim and an associated uninflated tire on the tire changer table and securing the rim and uninflated tire assembly to prevent any substantial axial movement of the tire and rim assembly relative to the table. The process also involves the enabling of inflation air flow in the inflation air conduit simultaneously with the securing of the rim against axial movement. As a result inflation air may thereafter be delivered through the air chuck to the interior of the tire without running the risk of property damage or personal injury should the tire be overinflated or should the tire bead explode from the tire rim for any other reason such as a faulty tire bead, for example.

As mentioned intially in the foregoing disclosure, many tire changers in use today have stationary tables which receive rims thereon. Tire beads are broken while on the stationary receiving tables and tires are both mounted and demounted while the rim is on the stationary table in a fashion which is widely known in the tire changing industry. However, with such tire changers a centrally located threaded post generally extends upwardly from the mounting table and receives some sort of cone nut on the threads for the purpose of clamping the rim and tire assembly in position on the stationary table to prevent axial motion between the table and the tire and rim assembly. The invention disclosed herein including wheel retention means abutted against a rim and tire assembly mounted on the table and locked in place is visualized as an alternative safety apparatus for stationary table type tire changers. Some means such as the buckle assembly 46 and the tongue 51, belt 29 and reel 31 assembly may be used for releasably locking the wheel retention means in position abutting the tire and rim assembly. A normally closed valve is actuated to an open position by the engagement of the releasable locking means and the abutted wheel retention means. In this fashion the normal inflation conduit for the tire changer is enabled by actuation of the normally closed valve and inflation air may be delivered to the mounted tire thorugh the air chuck 59 by subsequent actuation of inflation air control valve 86, by one of the foot pedals in the array 22 of FIG. 1.

When the inflation safety apparatus is not in use, it is pivoted about the pivot bolts 37 (FIG. 2) to the position seen in FIG. 1 in phantom lines and brought to rest on a hanger hook 92 attached to the side of the tower 12. Thus, the pivoted tube assembly 28 may be moved between a position overlying a tire and rim assembly mount table (FIG. 1 solid lines) and a position where the tube assembly is in an out of the way or stowed position (FIG. 1 phantom lines). Said alternatively, the vehicle wheel assembly hold-down apparatus may be positioned in abutting contact with a wheel rim and tire assembly to prevent axial movement of the wheel and tire assembly, or it may be positioned in a remote, out of the way position until it is necessary to inflate a tire newly mounted on a rim 24. It may be seen from the foregoing that the tire may not be inflated until the pivoted tube assembly 28 is so positioned nor until the buckle 51 at the end of the belt 29 is properly inserted and locked in the buckle assembly 46 as shown in FIGS. 3A, 3B and 3C. There is therefore no possibility for an untrained operator to overinflate a tire on a rim to the point of explosion, injury and damage without having the disclosed safety device firmly locked in place to restrain any axial tire and rim movement from whatever cause.

Figure 5:
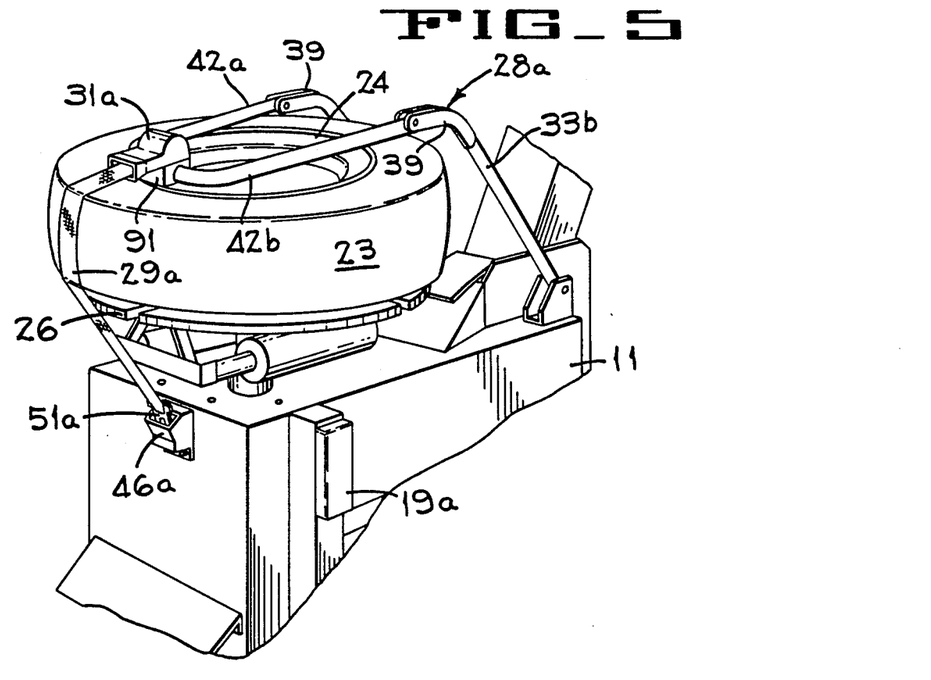
FIG. 5 is a partial perspective view of a tire changer utilizing another embodiment of the present invention.

In FIG. 5 a hold-down assembly 28a is shown which differs slightly from the hold-down assembly 28 seen in FIGS. 1 and 3. The two hold-down assemblies have the same metal tubes 33a and 33b, angled arms 39, and the two "J" shaped tube sections 42a and 42b in common. The common parts are joined similarly in both embodiments of the hold-down assembly. However, the embodiment of FIG. 5 does not have the buckle assembly 46 at the confluence of the two "J" shaped tube sections. In place of the buckle is a metal member 91 to which the ends of the "J" shaped tube sections remote from the angled arms 39 are fastened as by welding, for example. There is an upper mounting surface on the metal member 91 to which is attached an inertia reel assembly 31a, similar in most respects to the reel 31 hereinbefore described. Extending from the reel 31a is a webbed belt 29a, similar to the belt 29 described in conjunction with the embodiment of FIG. 1. A buckle assembly 46a is shown mounted in fixed position on the base 11 of the tire changer in FIG. 5. It may be seen that the hold-down assembly 28a of FIG. 5 is pivotally attached at one end to the tire changer base 11, and has a free end to which is attached the inertia reel 31a having the webbed belt 29a extending therefrom. The webbed belt 29a has a free end which is releasably engaged in the buckle 46a.

The manner in which the free end of the webbed belt 29a is engaged within the buckle 46a of FIG. 5 is described with reference to FIG. 6 of the drawings. The buckle assembly has a top cover 47a, housing 48a and a bottom cover 49a. The bottom cover 49a has an extension passing beyond the housing 48a which is used as a mounting flange so that the buckle assembly 46a may be securely fastened to the base 11 of the tire changer by means of bolts 93, for example.

Figure 6:
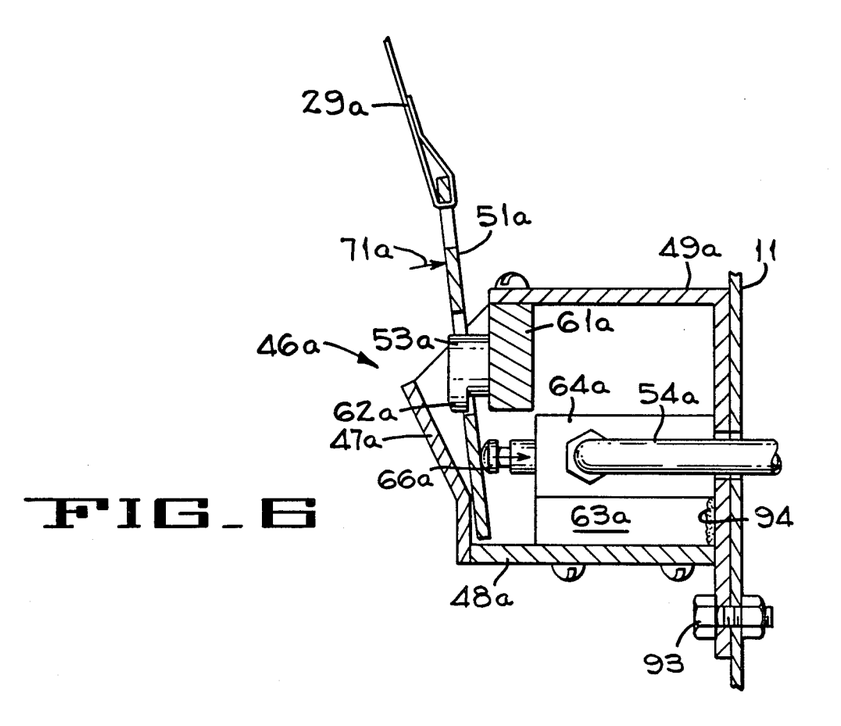
FIG. 6 is a sectional view depicting engagement of the tongue and buckle in the embodiment of FIG. 5.

FIG. 6 also shows a pneumatic hose 54a entering the buckle assembly 46a from the interior of the tire changer. An additional portion 57a of pneumatic hose extending back into the interior of the tire changer is not shown in FIG. 6. The pneumatic hose portion 54a is connected to a pneumatic valve 64a which is mounted on a valve mounting plate 63a welded to the bottom cover 49a as shown at 94. The housing 48a is secured to the other side of the valve mounting plate 63a.

A safety stud mounting plate 61a is fixed between the opposing walls of the housing 48a by means of welding, for example. A safety stud 53a is mounted centrally on the plate 61a also by some means such as welding. The safety stud has an overhanging lip 62a extending downwardly in the buckle assembly 46a of FIG. 6.

Figure 9:
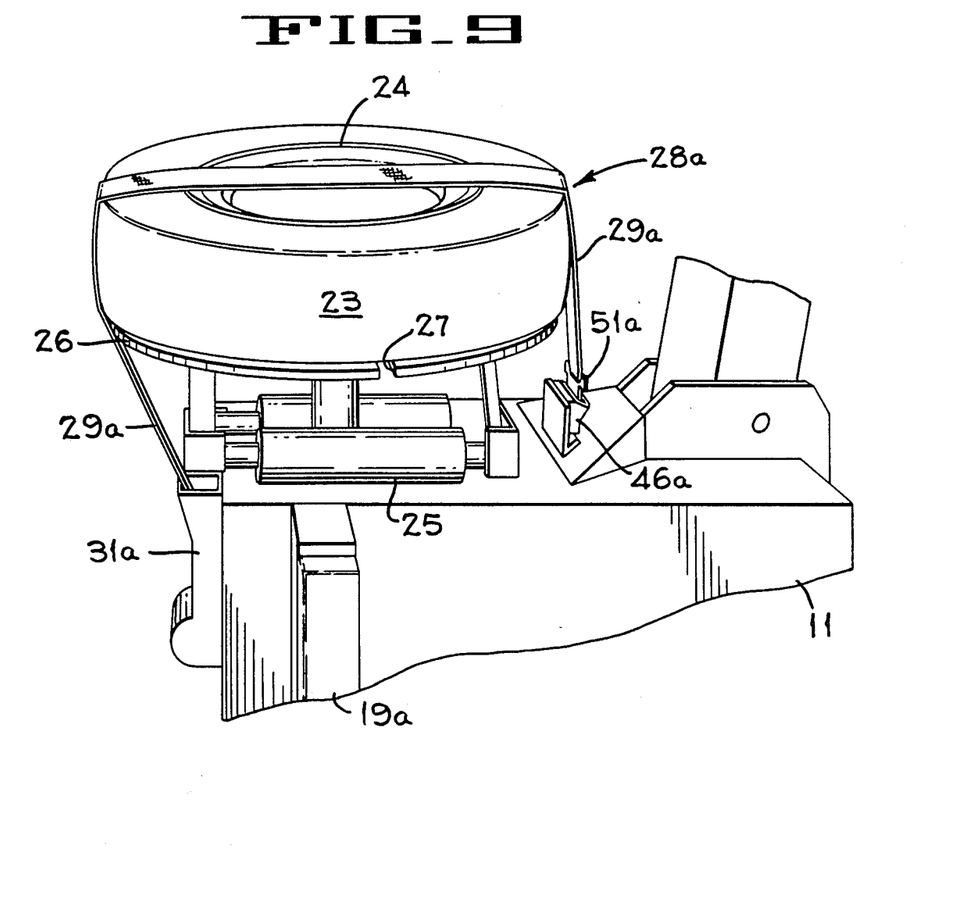
FIG. 9 is a partial perspective view of a tire changer utilizing yet another embodiment of the present invention.

The webbed belt 29a has a tongue 51a fixed thereto which is configured precisely the same as the tongue 51 in the embodiment of FIGS. 2 and 3A-3C. The top of the safety stud 53a and the overhanging lip 62a are of such a size in the direction of the extended lip to pass through the long dimension of the elongate hole 52 in the tongue 51a. The stud in its width dimension is of a size such as to pass through the width of the elongate hole 52, but with less clearance. The pneumatic valve is actuated by a button 66a extending from one side thereof. The button 66a is spring loaded to a position blocking flow of air through the valve 64a. It may be seen that when the tongue 51a is inserted the full distance into the buckle assembly 46a, and the tongue is moved in the direction of the arrow 71 in FIG. 6, that the tongue is captured within the buckle assembly 46a in the same fashion as described for capture of the tongue 51 within the buckle assembly 46 hereinbefore. It is apparent from the foregoing that the hold-down apparatus could consist entirely of a properly configured hold-down assembly 28a having a free end adapted to be engaged by the buckle assembly 46a, or it could take the form of an inertia reel 31a attached to one side of the tire changer and having a webbed belt 29a extending therefrom to engage a mechanism such as the buckle assembly 46a mounted on the other side of the tire changer as seen in FIG. 9. In either event, a hold-down apparatus would be provided which would prevent a tire and rim assembly (23-24) from moving axially in relation to the tire mounting table 26.

Figure 7:
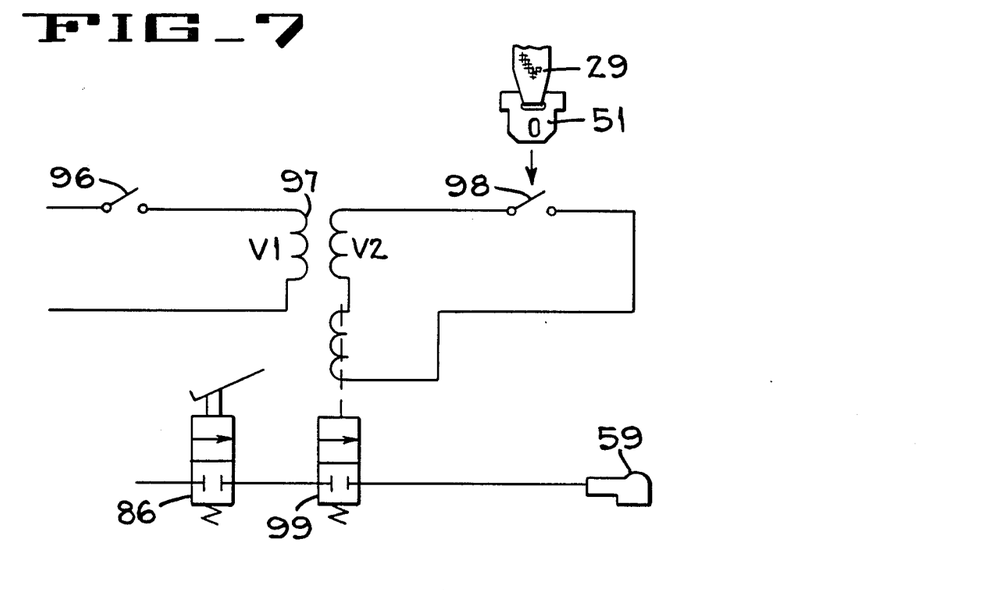
FIG. 7 is an electrical-pneumatic schematic of another alternative embodiment of the present invention.

Turning now to FIG. 7, an alternative embodiment of the safety apparatus of the present invention is described. In the electrical-pneumatic schematic of FIG. 7 electrical power available to operate the tire changer is provided through an on - off switch 96 to a step down transformer 97. Typical power to operate the tire changer may be multiphase or single phase. At any rate a voltage V1, such as 110 volts is stepped down to a voltage V2, such as 12 or 16 volts. When the hold-down apparatus locking mechanism is engaged, such as by insertion of the tongue 51 into the buckle 46, a normally opened microswitch 98 is moved to a closed position. A solenoid actuated valve 99 functions pneumatically the same as valve 64 hereinbefore described. In the embodiment of FIG. 7 when the microswitch 98 is closed, valve 99 is enabled to allow passage of tire inflation air to the air chuck 59. Consequently, actuation of the control lever associated with the inflation valve 86 by an operator delivers tire inflation air through the air chuck 59.

Figure 8:
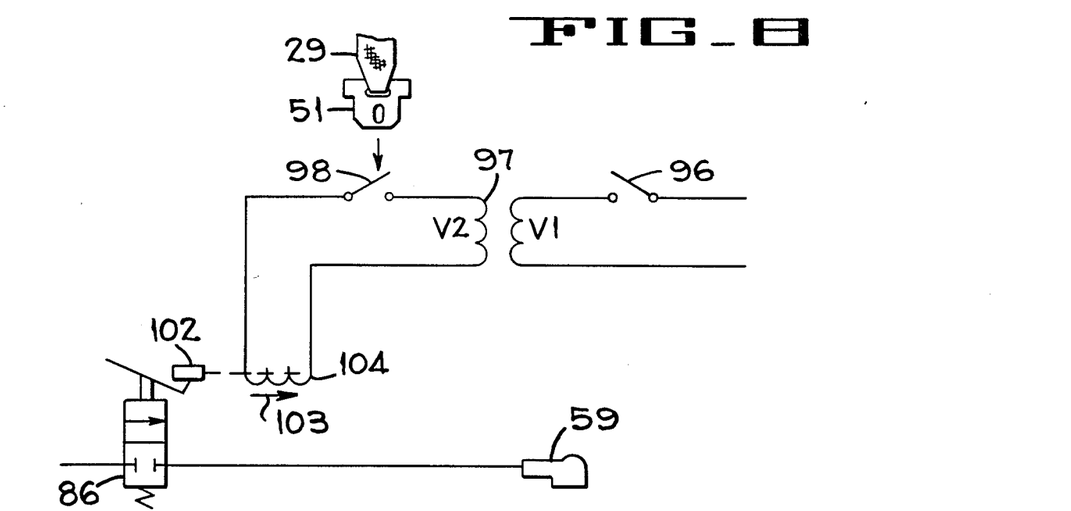
FIG. 8 is an electrical schematic of yet another embodiment of the present invention.

With reference now to FIG. 8 of the drawings, an additional embodiment of the present invention is depicted. The on - off switch 96 delivers power to the step down transformer 97 to convert voltage V1 to voltage V2 as explained in conjunction with the embodiment of FIG. 7. Also in a manner similar to the embodiment of FIG. 7, a member, such as the tongue 51, is engaged within a locking means such as the buckle assembly 46, which closes a normally open microswitch 98. A locking member 102 is movable in the direction of an arrow 103 when microswitch 98 is closed. Switch closure energizes a solenoid 104. Prior to energizing the solenoid, the locking member 102 is in a position to lock any movement of an operator accessible control for air inflation valve 86 as shown in FIG. 8. Upon closing microswitch 98 and energizing the solenoid, the locking member 102 is caused to move in the direction of the arrow 103, thus leaving the operator accessible control for air inflation valve 86 free to be moved to actuate valve 86. Tire inflation air is therefore passed through valve 86 and up to and through air chuck 59. Air inflation valve 86 may be seen to be normally closed and locked in the closed position until microswitch 98 is closed by engagement of the locking mechanism for the tire and rim assembly hold-down means on the tire changer.

Although the best mode contemplated for carrying out the present invention has been herein shown and described, it will be apparent that modification and variation may be made without departing from what may be regarded to be the subject matter of the invention.

What is claimed is:

1. Safety means on a tire changer having a table for receiving a tire and rim assembly and an inflation system, comprising tire and rim retention means attached to one side of the tire changer disposed adjacent one side of the table and movable between a position retaining a tire and rim on the table and a position remote therefrom, said retention means comprising a belt having a free end, valve means in the inflation system for alternately blocking and enabling air flow through the inflation system, releasable locking means fixed to the other side of the tire changer adjacent the other side of the table and adapted to couple with said belt free end, means actuated by said locking means when coupled with said belt free end for enabling said valve means, whereby when said belt is coupled with said locking means air flow is enabled in the inflation system and a tire and rim assembly will be retained on the table if it is overinflated to the point of explosion.

2. In a tire changer wherein a support table receives a tire and rim assembly for performance of operations thereon including tire installation on and removal from the rim, and wherein the tire is inflated by an inflation system while supported on the table following tire installation, the improvement comprising a safety device including belt means attached to said tire changer adjacent one side of said support table, said belt means having a free end, engaging means for coupling with said free end and being attached to said tire changer adjacent the other side of said support table, valve means in the inflation system for alternatively blocking and enabling air flow through the inflation system, and means mounted in said engaging means actuated by said belt free end for enabling said valve means to allow air flow.

3. The improvement in a tire changer as in claim 2 wherein said means for enabling comprises a mechanical valve opening member actuated by said belt free end.

4. The improvement in a tire changer as in claim 2 wherein said valve means is an electrically operated valve and wherein said means for enabling comprises electrical switch means actuated by said belt free end.

5. In a tire changer wherein a support table receives a tire and rim assembly for performance of operations thereon including tire installation on and removal from the rim, and wherein the tire is inflated by an inflation system while supported on the table following tire installation, the improvement comprising a safety device including belt means attached to said tire changer adjacent one side of said support table, said belt means having a free end, engaging means for coupling with said free end and being attached to said tire changer adjacent the other side of said support table, valve means in the inflation system for selectively blocking and enabling air flow through the inflation system, and means for alternatively locking and unlocking said valve means in the air flow blocking position, said last named means being actuated to said unlocking condition when said belt free end is coupled therewith.

* * * * *